United States Patent [19]

Dearman

[11] 4,388,765
[45] Jun. 21, 1983

[54] PIPEFITTERS SQUARE HOLDER

[76] Inventor: Timothy C. Dearman, P.O. Box 937, Pearland, Tex. 77581

[21] Appl. No.: 313,297

[22] Filed: Oct. 21, 1981

[51] Int. Cl.$^3$ .............................................. B43L 7/06
[52] U.S. Cl. .................................. 33/464; 33/174 N; 33/427
[58] Field of Search ................. 33/174 N, 180 R, 427, 33/452, 464, 478, 480, 485

[56] References Cited

U.S. PATENT DOCUMENTS

| | | | |
|---|---|---|---|
| 579,952 | 4/1897 | Campbell | 33/427 |
| 1,509,703 | 9/1924 | Bourgeois | 33/427 |
| 2,194,085 | 3/1940 | Hastings | 33/464 |
| 2,370,741 | 3/1945 | McDonnell | 33/464 |
| 3,670,418 | 6/1972 | Hamilton, Jr. | 33/174 N |

FOREIGN PATENT DOCUMENTS 523475 4/1931 Fed. Rep. of Germany ........ 33/427

Primary Examiner—Richard R. Stearns
Attorney, Agent, or Firm—Learman & McCulloch

[57] ABSTRACT

A pipefitter's square holder comprises a body having adjacent its side edges a plurality of ledges each of which is capable of supporting one leg of a square. Inwardly of each side edge is an abutment. A pair of clamp members is mounted on the body for movements relative to the latter and to one another between positions adjacent selected ones of the ledges, such clamp members being capable of removably clamping a square against the abutment associated with each of such ledges.

14 Claims, 4 Drawing Figures

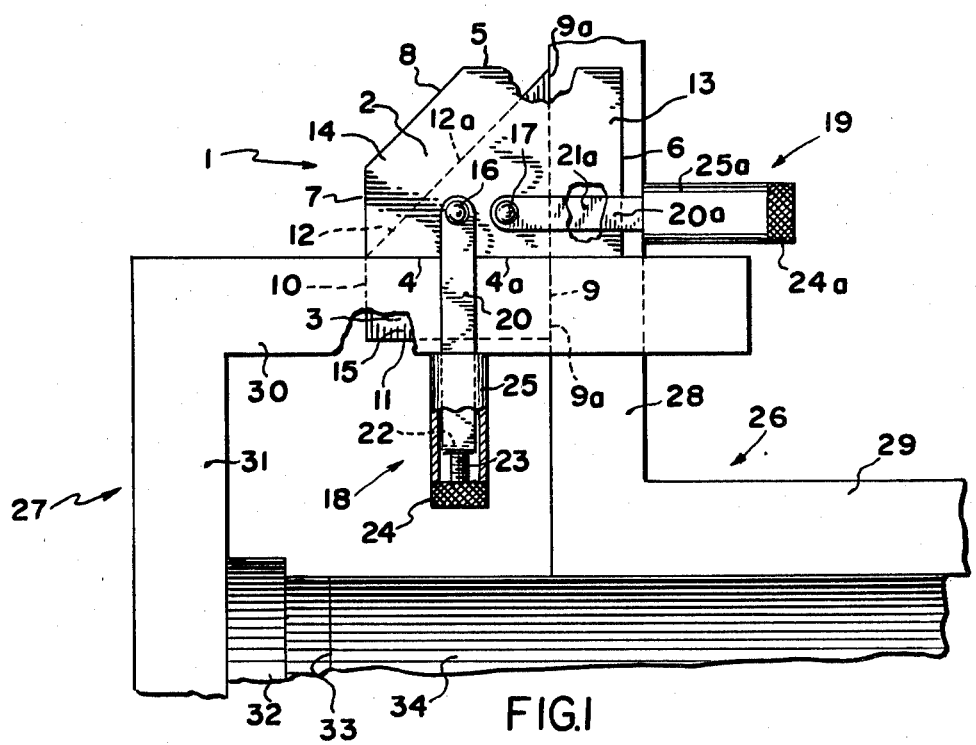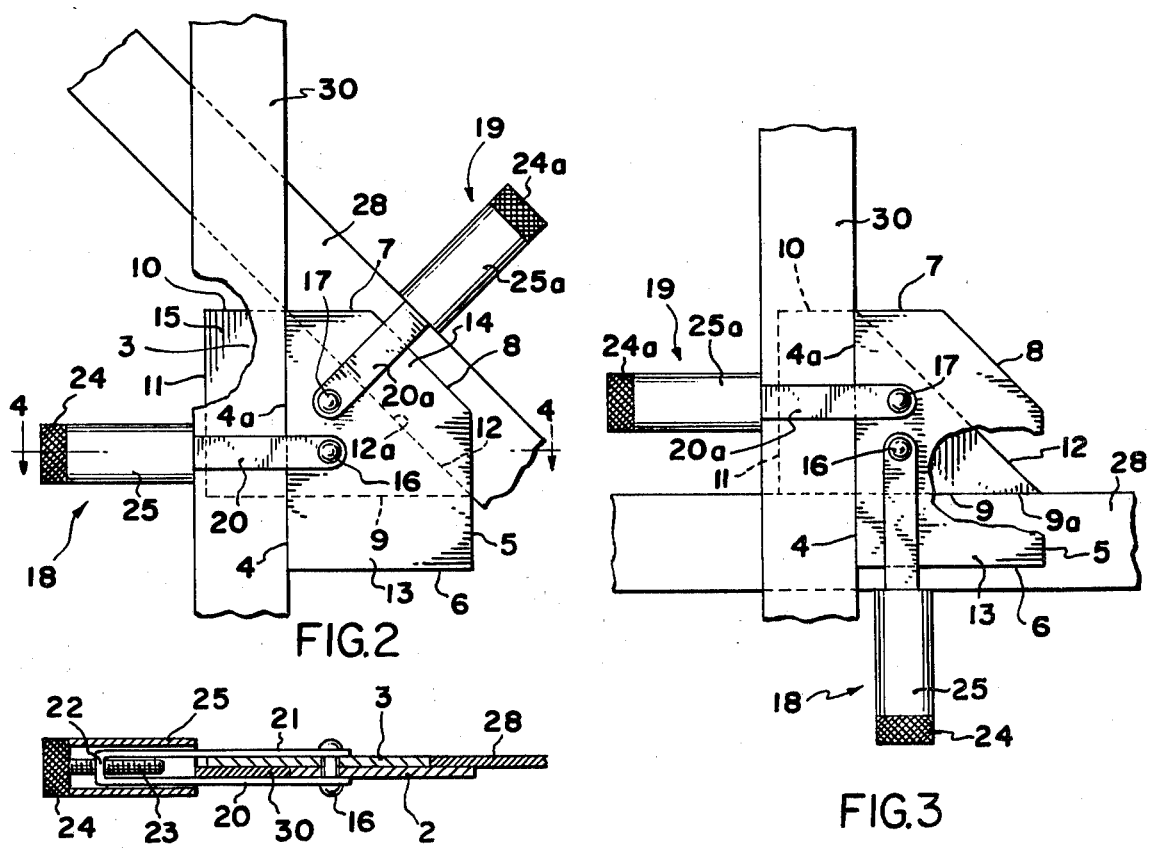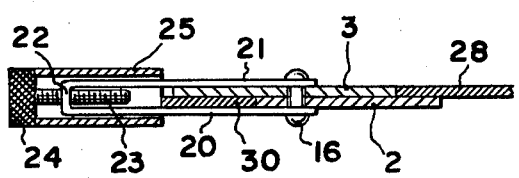

PIPEFITTERS SQUARE HOLDER

BACKGROUND OF THE INVENTION

In the welding of a pipe to other pipes and fittings it is essential that the two members be oriented properly with respect to one another. For example, if a flanged fitting is to be welded to one end of a pipe in such manner that the flange is perpendicular to the longitudinal axis of the pipe, the fitting must be located and held in such position during the welding operation. Proper orientation of pipes, elbows, tees, valves, and the like, is no less important in welding operations.

The positioning of pipes and devices to be welded thereto conventionally is accomplished by the use of one or more pipe welder's squares or straight edges. Each square comprises two legs joined together and extending at a right angle from one another. Each leg is provided with indicia which facilitates the orientation of the parts to be welded. Quite often it is necessary to use squares simultaneously, there exists a holder which is capable of holding two pipefitters's squares simultaneously. The known holder, however, comprises an essentially triangular-shaped body provided with reciprocable clamps extending beyond each of the three sides of the body so as to enable a leg of a square to occupy the space between the clamp and the adjacent edge of the body. Although such a holder does enable two squares to be supported simultaneously, it does have certain disadvantages. For example, there must be at least one clamp for each of the three sides of the body. Further, it sometimes is difficult to provide sufficient clearance to enable one leg of a square to overlie and extend beyond a leg of another square without deflecting one leg of one or both squares.

SUMMARY OF THE INVENTION

A square holder according to the invention comprises a flat body having a number of angularly spaced, linear side edges alongside, but inwardly of each of which extends an abutment. That portion of the body between each abutment and the associated side edge forms a ledge on which a leg of a square may be supported. The width of the ledge is less than that of the square leg so that the latter will overhang the associated side edge of the body. Not all of the abutments are located on the same side of the body. Instead, at least one abutment is formed on one side and the remainder are formed on the other side.

Pivoted on the body for swinging movements is a pair of supports each of which is of such length as to extend well beyond any side edge of the body and each of which carries a clamp which is reciprocable into and out of engagement with a leg of a square so as to clamp the latter firmly against an abutment.

DESCRIPTION OF THE DRAWINGS

A pipefitter's square holder constructed in accordance with the invention is disclosed in the following description and illustrated in the accompanying drawings, in which:

FIG. 1 is a fragmentary view, partly in elevation and partly in section illustrating a holder in use;

FIG. 2 is a view similar to FIG. 1, but illustrating the holder rotated 90° clockwise and some of the parts relocated;

FIG. 3 is a view similar to FIG. 2, but illustrating certain parts of the holder in adjusted positions; and FIG. 4 is a sectional view taken on the line 4—4 of FIG. 2.

DETAILED DESCRIPTION

A pipefitter's square holder according to the invention comprises a substantially flat body 1 which, in the disclosed embodiment, is composed of two planar plates 2 and 3 in overlying, face-to-face engagement. The plate 2 is in the form of a polyhedron having a first pair of longer and shorter parallel side edges 4 and 5, respectively; a second pair of longer and shorter parallel side edges 6 and 7, respectively; and an oblique side edge 8 which joins the two shorter side edges 5 and 7. The plate 3 is in the form of a polyhedron having a pair of longer and shorter parallel side edges 9 and 10, respectively, joined at corresponding ends by a straight edge 11 and at their opposite ends by an oblique straight edge 12.

The plates 2 and 3 are so arranged that the oblique edges 8 and 12 are parallel, but spaced from one another; the edges 6 and 9 are parallel, but spaced from one another; and the edges 4 and 11 are parallel and spaced from one another. The arrangement is such that the edges 9 and 12 of the plate 3 form abutments 9a and 12a, respectively, on one side of the body 1 and the edge 4 of the plate 2 forms an abutment 4a on the opposite side of the body.

That portion of the plate 2 extending beyond the edge 9 toward the edge 6 forms a ledge 13, that portion of the plate 2 extending beyond the edge 12 toward the edge 8 forms a ledge 14, and that portion of the body 3 extending beyond the edge 4 toward the edge 11 forms a ledge 15. The ledge 13 is at one side of the body 1, whereas the ledges 14 and 15 are at the opposite side of the body. The widths of the ledges may be uniform or different, as desired, subject to considerations to be described hereinafter.

The plates 2 and 3 are fixed to one another by rivets 16 and 17 and such rivets also serve as pivots by means of which clamping devices 18 and 19 are mounted on the body 1. The mounting device 18 comprises a U-shaped support having a pair of parallel legs 20 and 21 straddling the body 1 and being pivoted at corresponding ends to the body by the rivet 16. The opposite ends of the legs 20, 21 are joined by a web 22 having a threaded opening therein through which extends a correspondingly threaded shaft 23 fixed at one end to a knurled operating head 24. A force applying sleeve 25 slideably accommodates the support legs 20, 21 and is interposed between the body 1 and the head 24. Rotation of the operating head 24 in opposite directions enables the sleeve 25 to be moved longitudinally of the support arms toward and away from the body 1.

The clamp 19 corresponds to the clamp 18 and similar parts are identified by similar reference characters, followed by the suffix a.

The holder is adapted to be used with one or two pipefitter's squares 26 and 27, or with one square and a straight edge (not shown), or two straight edges. The square 26 has two right angular legs 28 and 29 and the square 27 also has two right angular legs 30 and 31. The legs of the respective squares may be of uniform width, as illustrated, or the legs could be of different widths. In any event, the widths of the legs should be greater than that of the respective ledges 13, 14, and 15 but should not be so great as to prevent the accommodation of such legs between the legs 20 and 21 of the respective clamps 18 and 19 and the clamping of the leg between the force applying sleeve 25, 25a and the abutment formed by the adjacent side edge of one of the plates forming the body 1.

FIG. 1 illustrates the use of the apparatus in the welding of a flanged fitting 32 to one end 33 of a pipe 34. The square 26 has its leg 28 accommodated between the legs 20a and 21a of the clamp 19 so as to lie flat upon the ledge 13. The knurled head 24a then is rotated so as to cause the clamping sleeve 25a to bear against the outboard edge of the leg 28 and clamp the latter tightly against the abutment 9a of the plate 3. The leg 29 of the square thus may rest upon the pipe 34 parallel to the longitudinal axis of the latter.

The square 27 has its leg 30 extending between the legs 20 and 21 of the clamp 18 in face-to-face engagement with the ledge 15. The clamp sleeve 25 maintains the leg 30 tightly against the abutment 4a formed by the plate 2. It should be noted at this point that the leg 30 is located at one side of the body 1, whereas the leg 28 is located at the opposite side of the body, and that the thickness of each plate 2 and 3 corresponds substantially to the thickness of each square, thereby enabling the legs 28 and 30 to overlie one another without deflection of either leg.

The leg 31 of the square 27 extends vertically downwardly and normal to the longitudinal axis of the pipe 34, thereby enabling the leg 31 to be used to ensure that the free end of the fitting 32 is normal to the longitudinal axis of the pipe 34. Clamping devices (not shown) may be used to maintain the fitting 32 in the position shown in FIG. 1 while it is tack welded to the pipe 43. Thereafter, the square holder and the squares may be removed and the welding completed.

In the arrangement shown in FIG. 2, the body 1 has been rotated 90° clockwise from the position shown in FIG. 1, the leg 28 of the square 26 has been moved to underlie the ledge 14 and bear against the abutment 12a formed by oblique side edge 12 of the plate 3, and the clamp 19 has been rotated 135° counterclockwise from the position shown in FIG. 1 so as to clamp the square leg 28 at an angle of 45° to the leg 30 of the square 27.

In the arrangement shown in FIG. 3, the square leg 28 has been moved to underlie the ledge 13, as in FIG. 1, and the clamp 18 has been rotated 90° counterclockwise from the position shown in FIG. 2 so as to clamp the leg 28 against the abutment 9a formed by the straight edge 9 of the member 3. The leg 30 of the square 27 is shown in the same position that it occupies in FIG. 2, but the leg 30 now is clamped against the abutment 4a by the clamp 19, rather than by the clamp 18.

It will be clear from the foregoing that each clamp is movable between at least two clamping positions in each of which it is operable to clamp a square leg or straight edge on a flange of the body 1. Thus, only two clamps are required even through each of two squares may be clamped in any one of three different positions.

Although the body has been disclosed as being composed of two different plates fixed to each other and having portions of each extending beyond the other to provide reduced thickness flanges at the perimeter of the body, it will be understood that the body could be composed of a single plate and that the abutments can be formed by making the associated flanges thinner than the thickness of the remainder of the plates.

This disclosure is representative of the presently preferred form of the invention, but is intended to be illustrative rather than definitive thereof. The invention is defined in the claims.

I claim:

1. A holder for use with a welder's square or the like, said holder comprising a substantially flat body having a number of angularly spaced, linear side edges; means forming an abutment inwardly of each of said edges, that portion of said body extending between an abutment and the associated side edge constituting a ledge; support means carried by said body for angular movements between a first position in which it overlies one of said ledges to a second position in which it overlies another of said ledges; and clamp means carried by said support means and operable to clamp said square against an abutment when said support means is in either selected one of said positions.

2. A holder according to claim 1 wherein the thickness of said body is reduced adjacent said side edges to form said ledges and said abutments.

3. A holder according to claim 1 wherein said support means comprises an arm pivoted at one end to said body.

4. A holder according to claim 3 wherein said clamp means comprises a force applying member carried by said arm at its other end and being reciprocable longitudinally of said arm.

5. A holder according to claim 4 including operating means reacting between said arm and said force applying member for moving the latter longitudinally of said arm.

6. A holder according to claim 1 wherein at least one of said abutments is on one side of said body and the remainder thereof are on the opposite side of said body.

7. A holder according to claim 1 wherein said square has a leg of selected width and wherein each of said ledges has a width less than said selected width.

8. A holder for use with a welder's square or the like, said holder comprising a substantially flat body having a number of linear side edges angularly spaced from one another; means forming an abutment inwardly of each of said side edges, that portion of said body between an abutment and the associated side edge constituting a ledge; a pair of supports carried by said body for angular movements relative to said body and to each other between a number of positions in each of which each of said supports overlies a ledge; and clamp means carried by each of said supports, each of said clamp means being operable to clamp a square against an abutment in each position of the associated support.

9. A holder according to claim 8 wherein the thickness of said body is reduced adjacent said side edges to form said ledges and said abutments.

10. A holder according to claim 8 wherein said support means comprises an arm pivoted at one end to said body.

11. A holder according to claim 10 wherein said clamp means comprises a force applying member carried by said arm at its other end and being reciprocable longitudinally of said arm.

12. A holder according to claim 11 including operating means reacting between said arm and said force applying member for moving the latter longitudinally of said arm.

13. A holder according to claim 8 wherein at least one of said abutments is on one side of said body and the remainder thereof are on the opposite side of said body.

14. A holder according to claim 8 wherein said square has a leg of selected width and wherein each of said ledges has a width less than said selected width.

* * * * *